United States Patent [19]

Robinson et al.

[11] Patent Number: 5,279,664
[45] Date of Patent: Jan. 18, 1994

[54] DISPERSING AGENTS FOR COMMINUTED SOLIDS

[75] Inventors: Glenn N. Robinson, Naperville; Gregory E. McWright, Park City, both of Ill.

[73] Assignee: Angus Chemical Company, Buffalo Grove, Ill.

[21] Appl. No.: 812,064

[22] Filed: Dec. 17, 1991

[51] Int. Cl.$^5$ .......... C04B 14/00; C09C 3/08; B01F 3/12; B01F 17/16; B01F 17/18; B01F 17/32

[52] U.S. Cl. ............. 106/506; 106/311; 106/413; 106/429; 106/445; 106/447; 106/448; 106/460; 106/465; 106/471; 106/476; 106/487; 106/491; 106/499; 106/400; 106/401; 106/402; 252/351; 252/357; 252/363.5

[58] Field of Search ............ 106/499, 506, 413, 429, 106/445, 447, 448, 460, 465, 471, 476, 487, 491, 400, 401, 402; 252/351, 357, 363.5

[56] References Cited

U.S. PATENT DOCUMENTS

| | | | |
|---|---|---|---|
| 4,017,324 | 4/1977 | Eggers | 106/487 |
| 4,345,945 | 8/1982 | Robinson | 106/448 |
| 4,370,171 | 1/1983 | Robinson et al. | 106/448 |
| 5,059,248 | 10/1991 | Signorino et al. | 106/402 |

*Primary Examiner*—Mark L. Bell
*Assistant Examiner*—Scott L. Hertzog
*Attorney, Agent, or Firm*—Arnold, White & Durkee

[57] ABSTRACT

A method for dispersing a comminuted solid in an aqueous medium is described. An aqueous dispersing agent is added to an aqueous medium in an amount sufficient to disperse the comminuted solid in the aqueous medium. The aqueous dispersing agent includes from about 10 wt. % to about 55 wt. % of an amine compound selected from the group consisting of alkanolamines, triethylamine and morpholine, from about 15 wt. % to about 35 wt. % of a base selected from the group consisting of sodium hydroxide and potassium hydroxide, and from about 0.1 wt. % to about 15 wt. % chelating agent.

23 Claims, No Drawings is a mixture of 2-amino-2-methyl-1-propanol (AMP TM) and monoethanolamine. AMP TM, AMP-95 TM, AMP-90 TM, AEPD TM, AMPD TM, and Tris amino ® are manufactured by ANGUS Chemical Co.

DISPERSING AGENTS FOR COMMINUTED SOLIDS

FIELD OF THE INVENTION

The present invention relates generally to methods of dispersing comminuted solids. This invention particularly relates to adding a dispersing agent to comminuted solids in an aqueous medium.

BACKGROUND OF THE INVENTION

Slurries and suspensions of comminuted solids in an aqueous medium generally contain a dispersing agent to effectively disperse the solids. Commonly used dispersants include anionic polyelectrolytes and alkanolamines such as 2-amino-2-methyl-1-propanol (AMP TM). U.S. Pat. No. 4,017,324 discloses a slurry containing kaolin clay, a suspending agent and an alkanolamine dispersant. U.S. Pat. No. 4,345,945 describes an AMP TM phosphate salt which disperses pigments in a water based, flat wall paint. The AMP TM phosphate salt is prepared by mixing AMP TM with phosphoric acid. U.S. Pat. No. 4,370,171 also discloses an agent for dispersing pigments in a water based paint. The agent is formed from an alkanolamine and a polymeric carboxylic acid.

Monoisopropanolamine (MIPA TM), sold by Dow Chemical Company, is used to aid dispersion of pigments and other comminuted solids. Although MIPA TM is a suitable dispersant, it is a high cost material. A need exists for a lower cost dispersant that is at least as effective as MIPA TM.

The dispersing agent of the present invention is more effective than MIPA TM as indicated in the dispersion performance tests for gloss development, high-shear viscosity stability, dispersion stability (seeding), while contributing to an overall reduction in yellowing. The dispersing agent is a low cost material because it contains less than 55 wt. % active material as compared to 100 wt. % MIPA TM.

SUMMARY OF THE INVENTION

In order to satisfy the need for an efficient, cost effective dispersing agent, one aspect of the present invention provides an aqueous dispersant composition including from about 10 wt. % to about 55 wt. % of an amine compound selected from the group consisting of alkanolamines, triethylamine and morpholine, from about 15 wt. % to about 35 wt. % of a base selected from the group consisting of sodium hydroxide and potassium hydroxide, and from about 0.1 wt. % to about 15 wt. % chelating agent. The alkanolamine is selected from the group consisting of 2-amino-2-methyl-1-propanol, 2-amino-1-butanol, the mono-, di-, and tri-isopropanolamines and ethanolamines, 2-amino-2-methyl-1,3-propanediol, 2-amino-2-ethyl-1,3-propanediol, 2-amino-2-hydroxymethyl-1,3-propanediol, and N-alkyl and N,N-dialkyl derivatives thereof.

In a preferred embodiment, the amine compound is a mixture of from about 8 wt. % to about 30 wt. % 2-amino-2-methyl-1-propanol and from about 3 wt. % to about 25 wt. % monoethanolamine. The preferred chelating agent is ethylenediaminetetraacetic acid or a salt thereof such as a tetrasodium salt of ethylenediaminetetraacetic acid or a trisodium salt of N-hydroxyethylenediaminetetraacetic acid.

A further aspect of the invention is directed to a method for dispersing a comminuted solid in an aqueous medium. An aqueous dispersing agent as described above is added to an aqueous medium in an amount sufficient to disperse the comminuted solid in the aqueous medium. The dispersing agent is useful for dispersing a variety of comminuted solids including calcium carbonate, inorganic pigments such as iron oxides, talc (magnesium silicates), silica, mica, bentonite, carbon black, chrome pigments, and organic pigments. These comminuted solids are typically present in pigment slurries, water based coatings such as latex paints, or systems employing hard water (e.g., cooling tower waters and boiler waters).

It is an object of this invention to provide a low cost dispersing agent which is more effective than MIPA TM in gloss development, high-shear viscosity stability, yellowing resistance and dispersion stability seeding).

It is another object of this invention to provide a method for dispersing comminuted solids in an aqueous system. Particularly, this invention provides a method for dispersing pigments in a slurry, or for dispersing pigments or fillers in a water based coating. A method for dispersing calcium carbonate which develops in hard water systems is also provided.

Other objects will be apparent to those skilled in the art from the disclosure herein.

DETAILED DESCRIPTION OF THE INVENTION

The present invention provides a dispersant composition which is more effective than MIPA TM in gloss development, high-shear viscosity stability, yellowing resistance and dispersion stability (seeding). The composition is useful for dispersing a variety of comminuted solids including calcium carbonate, inorganic pigments such as iron oxides, talc (magnesium silicates), silica, mica, bentonite, carbon black, chrome pigments, and organic pigments. These comminuted solids are typically present in pigment slurries, water based coatings such as latex paints, or systems employing hard water (e.g., cooling tower waters and boiler waters).

The dispersant composition of the present invention contains from about 10 wt. % to about 55 wt. % of an amine compound selected from the group consisting of alkanolamines, triethylamine and morpholine, from about 15 wt. % to about 35 wt. % of a base selected from the group consisting of alkali metals such as sodium hydroxide and potassium hydroxide, from about 0.1 wt. % to about 15 wt. % chelating agent, and from about 30 wt. % to about 50 wt. % water. The dispersant composition is prepared by admixing the amine compound, base and chelating agent with water. The order of addition is uncritical.

The amine compound of the present invention may be an alkanolamine selected from the group consisting of 2-amino-2-methyl-1-propanol (AMP TM), 2-amino-1-butanol, the mono-, di-, and tri-isopropanolamines and ethanolamines, 2-amino-2-methyl-1,3-propanediol, 2-amino-2-ethyl-1,3-propanediol (AMPD TM), 2-amino-2-hydroxymethyl-1,3-propanediol (AEPD TM), and N-alkyl and N,N-dialkyl derivatives thereof. Preferably, the amine compound of the dispersant composition is a mixture of 2-amino-2-methyl-1-propanol (AMP TM) and monoethanolamine. AMP TM, AMP-95 TM, AMP-90 TM, AEPD TM, AMPD TM, and Tris amino ® are manufactured by ANGUS Chemical Co.

The preferred chelating agent of the present invention is a tetrasodium salt of ethylenediaminetetraacetic acid or a trisodium salt of N-hydroxyethylenediaminetetraacetic acid. Vinkeel® 100 LNG is a tetrasodium salt of ethylenediaminetetraacetic acid that is sold by Vinings Industries of Atlanta, Ga. Chel DM-41 is a trisodium salt of N-hydroxyethylenediaminetetraacetic acid sold by Ciba-Geigy Corporation.

Preferably, the dispersant composition includes from about 8 wt. % to about 30 wt. % 2-amino-2-methyl-1-propanol, from about 3 wt. % to about 25 wt. % monoethanolamine, from about 15 wt. % to about 35 wt. % sodium hydroxide, from about 0.1 wt. % to about 15 wt. % ethylenediaminetetraacetic acid or a salt thereof, and from about 30 wt. % to about 50 wt. % water. In a preferred embodiment, the dispersant composition is prepared by mixing 41.0 wt. % water with 25.0 wt. % of 50% sodium hydroxide, 19.0 wt. % AMP-95 TM, 13.0 wt. % monoethanolamine and 2.0 wt. % Vinkeel® 100 LNG.

A further aspect of the invention is directed to a method for dispersing a comminuted solid in an aqueous medium. According to the method, an effective amount of the dispersant composition of the present invention as described above is intimately admixed with the aqueous medium. An effective amount of the dispersant composition is an amount sufficient to disperse the comminuted solids in the aqueous medium. The amount of dispersant which is generally required is from about 0.001 wt. % to about 10 wt. % based on the weight of the comminuted solid. Most often, from about 0.001 wt. % to about 1.0 wt. % dispersant is mixed with the aqueous medium.

According to one embodiment of the invention, a slurry including at least one pigment is provided. The dispersant composition is added to the slurry in an amount sufficient to disperse the pigment in the slurry.

According to another embodiment of the invention, a water based coating including at least one comminuted solid is provided. The comminuted solid of the coating may include pigments and fillers such as titanium dioxide and talc. The dispersant composition is added to the coating in an amount sufficient to disperse the pigments, fillers, or other comminuted solids in the coating. A water based coating that is characteristic of the present invention is a latex paint which may include pigments, thickeners, surfactants, solvents, biocides, mildewcides and other conventional paint formulation components.

In a third embodiment of the invention, the dispersant composition is added to water in cooling tower or boiler systems. The dispersant composition disperses calcium carbonate that forms in the water.

The following examples are presented to describe preferred embodiments and utilities of the present invention and are not meant to limit the present invention unless otherwise stated in the claims appended hereto.

EXAMPLES

A dispersant composition of the present invention was prepared by mixing the following ingredients in the order shown below:
Water: 41.0% by weight
50% Sodium Hydroxide: 25.0%
AMP-95 TM: 19.0%
Monoethanolamine: 13.0%
Vinkeel® 100 LNG: 2.0%

The dispersant composition ("dispersant") was used in preparing several water based latex paint formulations. These paint formulations were also prepared using an equal amount of MIPA TM in place of the dispersant. The properties of these paint formulations are compared in the following examples.

The paint formulations are compared on the basis of viscosity, pH stability, yellowing, opacity, brightness, seeding, settling, syneresis, sheen, gloss development, scrub resistance, and can rusting. Viscosity, pH, yellowing, opacity, sheen and brightness are initially measured for a paint sample. The paint sample is then aged for four weeks at an elevated temperature of about 120°-140° F. before another measurement is taken. In determining freeze-thaw viscosity stability, another sample of the same paint is frozen for one day and then thawed. The freeze-thaw procedure is repeated five times and viscosity is measured to determine freeze-thaw stability. Seeding, settling and syneresis are evaluated by both the four week heat age and freeze-thaw procedures.

Low shear viscosity was determined using a Stormer viscometer sold by Arthur H. Thomas Co. of Philadelphia, Pa. High shear viscosity was measured using a VR-4310 cone and plate viscometer sold by Imperial Chemical Industries. A spectrocolorimeter or other reflectance measuring device is used to determine yellowing, opacity and brightness indices.

Seeding, settling, syneresis and can rusting are determined visually. Seeding occurs when particles are evident in a paint film. Seeding adversely affects the gloss, opacity and scrub resistance properties of a paint, and indicates poor dispersion performance. Syneresis develops when a phase separation occurs in the paint on standing, resulting in a clear liquid layer on the surface.

EXAMPLE 1

Exterior Flat B

A formulation representing one hundred gallons of an exterior flat latex paint containing 0.19 gallon of the dispersant composition of the present invention was prepared. Likewise, a formulation representing one hundred gallons of the exterior flat latex paint containing an equal amount of MIPA TM was prepared. The results of the tests which were performed on the paint formulations are listed below:

| TESTS | MIPA TM | Dispersant |
|---|---|---|
| VISCOSITY [cP] | | |
| Initial | 84 | 85 |
| 4 Weeks Heat Age | 90 | 91 |
| Freeze-Thaw | 93 | 95 |
| Max Difference | 9 | 10 |
| CONE & PLATE [cP] | | |
| Initial | 0.65 | 0.60 |
| 4 Weeks Heat Age | 0.70 | 0.70 |
| Freeze-Thaw | 2.00 | 2.05 |
| Max Difference | 1.35 | 1.45 |
| pH | | |
| Initial | 9.6 | 9.5 |
| 4 Weeks Heat Age | 8.8 | 8.7 |
| Difference | −0.8 | −0.8 |
| YELLOWING | | |
| Initial | 5.38 | 5.06 |
| 4 Weeks Heat Age | 6.60 | 5.47 |
| Difference | +1.22 | +0.41 |
| OPACITY | | |
| Initial | 95.95 | 95.48 |

| TESTS | MIPA ™ | Dispersant |
|---|---|---|
| 4 Weeks Heat Age | 94.84 | 94.83 |
| Difference | −1.11 | −0.65 |
| BRIGHTNESS | | |
| Initial | 88.00 | 87.66 |
| 4 Weeks Heat Age | 86.99 | 87.17 |
| Difference | −1.01 | −0.49 |
| SEEDING | | |
| 4 Weeks Heat Age | E | E |
| Freeze-Thaw | F | F |
| SETTLING | | |
| 4 Weeks Heat Age | E | E |
| Freeze-Thaw | E | E |
| SYNERESIS | | |
| 4 Weeks Heat Age | E | E |
| Freeze-Thaw | E | E |
| SHEEN | | |
| Initial | 2.4 | 2.5 |
| 4 Weeks Heat Age | 2.3 | 2.3 |
| Max Difference | 0.1 | 0.2 |
| CAN RUSTING | E | E |

E = Excellent  G = Good  P = Poor  F = Fail

Both paint formulations showed average performance in viscosity stability, pH stability, brightness, seeding, settling, syneresis, sheen and can rusting. However, the paint containing the dispersant of the present invention showed above average performance with regard to yellowing and opacity in comparison to only fair performance of the MIPA ™ containing formulation.

EXAMPLE 2

Exterior Flat A

A formulation representing one hundred gallons of an exterior flat latex paint containing 0.19 gallon of the dispersant composition of the present invention was prepared. Likewise, a formulation representing one hundred gallons of the exterior flat latex paint containing an equal amount of MIPA ™ was prepared. The results of the tests which were performed on the paint formulations are listed below:

| TESTS | MIPA ™ | Dispersant |
|---|---|---|
| VISCOSITY [cP] | | |
| Initial | 104 | 106 |
| 4 Weeks Heat Age | 105 | 106 |
| Freeze-Thaw | 100 | 102 |
| Max Difference | 5 | 4 |
| CONE & PLATE [Cp] | | |
| Initial | 1.1 | 1.1 |
| 4 Weeks Heat Age | 1.1 | 1.1 |
| Freeze-Thaw | 1.0 | 1.0 |
| Max Difference | −0.1 | −0.1 |
| Ph | | |
| Initial | 9.5 | 9.5 |
| 4 Weeks Heat Age | 9.8 | 9.8 |
| Difference | +0.3 | +0.3 |
| YELLOWING | | |
| Initial | 5.47 | 5.34 |
| 4 Weeks Heat Age | 5.17 | 4.98 |
| Difference | −0.30 | −0.36 |
| OPACITY | | |
| Initial | 95.96 | 94.76 |
| 4 Weeks Heat Age | 95.85 | 95.66 |
| Difference | −0.11 | +0.90 |
| BRIGHTNESS | | |
| Initial | 88.11 | 88.06 |
| 4 Weeks Heat Age | 88.19 | 88.06 |
| Difference | +0.08 | 0 |
| SEEDING | | |
| 4 Weeks Heat Age | E | E |
| Freeze-Thaw | E | E |
| SETTLING | | |
| 4 Weeks Heat Age | E | E |
| Freeze-Thaw | E | E |
| SYNERESIS | | |
| 4 Weeks Heat Age | E | E |
| Freeze-Thaw | E | E |
| SHEEN | | |
| Initial | 2.1 | 2.2 |
| 4 Weeks Heat Age | 2.2 | 2.2 |
| Freeze-Thaw | 2.0 | 2.0 |
| Max Difference | 0.2 | 0.2 |
| CAN RUSTING | E | E |

E = Excellent  G = Good  P = Poor  F = Fail

Both paint formulations showed average performance in the above listed tests.

EXAMPLE 3

Exterior Gloss

A formulation representing one hundred gallons of an exterior gloss latex paint containing 0.19 gallon of the dispersant composition of the present invention was prepared. Likewise, a formulation representing one hundred gallons of the exterior gloss latex paint containing an equal amount of MIPA ™ was prepared. The results of the tests which were performed on the paint formulations are listed below:

| TESTS | MIPA ™ | Dispersant |
|---|---|---|
| VISCOSITY [cP] | | |
| Initial | 89 | 89 |
| 4 Weeks Heat Age | 96 | 97 |
| Freeze-Thaw | 91 | 91 |
| Max Difference | 7 | 7 |
| CONE & PLATE [cP] | | |
| Initial | 0.8 | 0.8 |
| 4 Weeks Heat Age | 0.7 | 0.7 |
| Freeze-Thaw | 0.8 | 0.8 |
| Max Difference | 0.1 | 0.1 |
| pH | | |
| Initial | 9.55 | 9.50 |
| 4 Weeks Heat Age | 9.60 | 9.40 |
| Difference | 0.05 | 0.10 |
| YELLOWING | | |
| Initial | 2.96 | 2.98 |
| 4 Weeks Heat Age | 4.21 | 3.83 |
| Difference | +1.25 | +0.85 |
| OPACITY | | |
| Initial | 95.54 | 94.64 |
| 4 Weeks Heat Age | 95.68 | 96.05 |
| Difference | +0.14 | +1.41 |
| BRIGHTNESS | | |
| Initial | 91.48 | 91.38 |
| 4 Weeks Heat Age | 91.11 | 91.05 |
| Difference | −0.37 | −0.33 |
| SEEDING | | |
| 4 Weeks Heat Age | P | G |
| Freeze-Thaw | G | G |
| SETTLING | | |
| 4 Weeks Heat Age | G | G |
| Freeze-Thaw | G | G |
| SYNERESIS | | |
| 4 Weeks Heat Age | G | G |
| Freeze-Thaw | G | G |
| GLOSS | | |

| TESTS | MIPA ™ | Dispersant |
|---|---|---|
| Initial | 34.2 | 35.1 |
| 4 Weeks Heat Age | 33.7 | 34.9 |
| Freeze-Thaw | 40.2 | 39.9 |
| Max Difference | 6.5 | 5.0 |
| CAN RUSTING | E | E |

E = Excellent  G = Good  P = Poor  F = Fail

Both paint formulations showed average performance in viscosity stability, pH stability, yellowing, brightness, settling, syneresis and can rusting. However, the paint containing the dispersant of the present invention showed average performance with regard to seeding while the MIPA ™ containing formulation showed fair performance. The dispersant containing formulation performed fairly with regard to opacity, and the MIPA ™ containing formulation was average in performance. The dispersant containing formulation showed good performance for gloss development in comparison to average performance of the MIPA ™ containing formulation.

EXAMPLE 4

Exterior Satin

A formulation representing one hundred gallons of an exterior satin latex paint containing 0.19 gallon of the dispersant composition of the present invention was prepared. Likewise, a formulation representing one hundred gallons of the exterior satin latex paint containing an equal amount of MIPA ™ was prepared. The results of the tests which were performed on the paint formulations are listed below:

| TESTS | MIPA ™ | Dispersant |
|---|---|---|
| VISCOSITY [cP] | | |
| Initial | 97 | 97 |
| 4 Weeks Heat Age | 107 | 107 |
| Freeze-Thaw | 100 | 100 |
| Max Difference | 10 | 10 |
| CONE & PLATE [cP] | | |
| Initial | 0.95 | 0.90 |
| 4 Weeks Heat Age | 1.00 | 0.95 |
| Freeze-Thaw | 1.00 | 0.90 |
| Max Difference | 0.05 | 0.05 |
| pH | | |
| Initial | 9.50 | 9.40 |
| 4 Weeks Heat Age | 8.75 | 8.65 |
| Difference | −0.75 | −0.75 |
| YELLOWING | | |
| Initial | 3.67 | 3.70 |
| 4 Weeks Heat Age | 5.28 | 4.58 |
| Difference | +1.61 | +0.88 |
| OPACITY | | |
| Initial | 95.15 | 95.67 |
| 4 Weeks Heat Age | 94.61 | 94.31 |
| Difference | −0.54 | −1.36 |
| BRIGHTNESS | | |
| Initial | 91.18 | 90.97 |
| 4 Weeks Heat Age | 90.23 | 90.00 |
| Difference | −0.95 | −0.97 |
| SEEDING | | |
| 4 Weeks Heat Age | E | E |
| Freeze-Thaw | E | E |
| SETTLING | | |
| 4 Weeks Heat Age | E | E |
| Freeze-Thaw | E | E |
| SYNERESIS | | |
| 4 Weeks Heat Age | E | E |
| Freeze-Thaw | E | E |
| GLOSS | | |
| Initial | 20.1 | 19.5 |
| 4 Weeks Heat Age | 26.4 | 25.0 |
| Freeze-Thaw | 26.8 | 27.6 |
| Max Difference | +6.7 | +8.1 |
| SCRUB RESISTANCE | 860 | 846 |
| CAN RUSTING | E | E |

E = Excellent  G = Good  P = Poor  F = Fail

Both paint formulations showed average performance in viscosity stability, pH stability, opacity, brightness, seeding, settling, syneresis, gloss development, scrub resistance and can rusting. However, the paint containing the dispersant of the present invention showed average performance with regard to yellowing in comparison to only fair performance of the MIPA ™ containing formulation.

EXAMPLE 5

High Quality Interior Flat

A formulation representing one hundred gallons of a high quality interior flat latex paint containing 0.38 gallon of the dispersant composition of the present invention was prepared. Likewise, a formulation representing one hundred gallons of the high quality interior flat latex paint containing an equal amount of MIPA ™ was prepared. The results of the tests which were performed on the paint formulations are listed below:

| TESTS | MIPA ™ | Dispersant |
|---|---|---|
| VISCOSITY [cP] | | |
| Initial | 103 | 100 |
| 4 Weeks Heat Age | 102 | 105 |
| Difference | 1 | 5 |
| CONE & PLATE [cP] | | |
| Initial | 1.25 | 1.30 |
| 4 Weeks Heat Age | 1.05 | 1.20 |
| Difference | −0.20 | −0.10 |
| FREEZE-THAW | | |
| Stormer | >150 | >150 |
| Cone & Plate | 3.05 | 3.2 |
| pH | | |
| Initial | 9.2 | 9.1 |
| 4 Weeks Heat Age | 8.2 | 8.2 |
| Difference | −1.0 | −0.9 |
| YELLOWING | | |
| Initial | 5.79 | 5.23 |
| 4 Weeks Heat Age | 7.51 | 7.14 |
| Difference | 1.72 | +1.91 |
| OPACITY | | |
| Initial | 96.92 | 96.59 |
| 4 Weeks Heat Age | 96.05 | 96.21 |
| Difference | −0.87 | −0.38 |
| BRIGHTNESS | | |
| Initial | 88.90 | 88.69 |
| 4 Weeks Heat Age | 88.36 | 88.46 |
| Difference | −0.54 | −0.23 |
| SEEDING | | |
| 4 Weeks Heat Age | E | E |
| Freeze-Thaw | E | E |
| SETTLING | | |
| 4 Weeks Heat Age | E | E |
| Freeze-Thaw | E | E |
| SYNERESIS | | |
| 4 Weeks Heat Age | E | E |
| Freeze-Thaw | E | E |
| SHEEN | | |
| Initial | 3.0 | 3.0 |
| 4 Weeks Heat Age | 3.4 | 3.8 |

| TESTS | MIPA ™ | Dispersant |
|---|---|---|
| Freeze-Thaw | N/A | N/A |
| Max Difference | 0.4 | 0.8 |
| CAN RUSTING | E | E |
| SCRUB RESISTANCE | 348 | 306 |

E = Excellent  G = Good  P = Poor  F = Fail

Both paint formulations showed average performance in low shear viscosity stability, freeze-thaw viscosity stability, pH stability, yellowing, opacity, brightness, seeding, settling, syneresis, sheen, scrub resistance and can rusting. However, the paint containing the dispersant of the present invention showed average performance with regard to high shear viscosity stability in comparison to fair performance of the MIPA ™ containing formulation.

EXAMPLE 6

High PVC Interior Flat

A formulation representing one hundred gallons of a high PVC interior flat latex paint containing 0.44 gallon of the dispersant composition of the present invention was prepared. Likewise, a formulation representing one hundred gallons of the high PVC interior flat latex paint containing an equal amount of MIPA ™ was prepared. The results of the tests which were performed on the paint formulations are listed below:

| TESTS | MIPA ™ | Dispersant |
|---|---|---|
| VISCOSITY [cP] | | |
| Initial | 91 | 93 |
| 4 Weeks Heat Age | 91 | 93 |
| Difference | 0 | 0 |
| CONE & PLATE [cP] | | |
| Initial | 0.50 | 0.50 |
| 4 Weeks Heat Age | 0.45 | 0.45 |
| Difference | −0.50 | −0.05 |
| FREEZE-THAW [cP] | | |
| Stormer | Gel | Gel |
| Cone & Plate | Gel | Gel |
| pH | | |
| Initial | 9.55 | 9.45 |
| 4 Weeks Heat Age | 8.78 | 8.68 |
| Difference | −0.77 | −0.77 |
| YELLOWING | | |
| Initial | 5.58 | 5.42 |
| 4 Weeks Heat Age | 6.28 | 5.59 |
| Difference | +0.70 | +0.17 |
| OPACITY | | |
| Initial | 99.13 | 98.60 |
| 4 Weeks Heat Age | 98.46 | 97.71 |
| Difference | −0.67 | −0.89 |
| BRIGHTNESS | | |
| Initial | 85.65 | 86.34 |
| 4 Weeks Heat Age | 85.87 | 86.77 |
| Difference | +0.22 | +0.43 |
| SEEDING | | |
| 4 Weeks Heat Age | E | E |
| Freeze-Thaw | Gel | Gel |
| SETTLING | | |
| 4 Weeks Heat Age | E | E |
| Freeze-Thaw | Gel | Gel |
| SYNERESIS | | |
| 4 Weeks Heat Age | E | E |
| Freeze-Thaw | Gel | Gel |
| SHEEN | | |
| Initial | 1.5 | 1.6 |
| 4 Weeks Heat Age | 1.4 | 1.3 |
| Freeze-Thaw | Gel | Gel |
| Max Difference | −0.1 | −0.3 |
| SCRUB RESISTANCE | 13 | 13 |
| CAN RUSTING | E | E |

E = Excellent  G = Good  P = Poor  F = Fail

Both paint formulations showed average performance in viscosity stability, pH stability, opacity, brightness, seeding, settling, syneresis, sheen, scrub resistance and can rusting. However, the paint containing the dispersant of the present invention showed good performance with regard to yellowing in comparison to average performance of the MIPA ™ containing formulation.

While the invention is susceptible to various modifications and alternative forms, specific embodiments thereof have been shown by way of example and were herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

I claim:

1. An aqueous dispersant composition comprising from about 10 wt. % to about 55 wt. % of an amine compound selected from the group consisting of alkanolamines, triethylamine and morpholine; from about 15 wt. % to about 35 wt. % of a base selected from the group consisting of sodium hydroxide and potassium hydroxide; and from about 0.1 wt. % to about 15 wt. % chelating agent.

2. The composition of claim 1 wherein said alkanolamine is selected from the group consisting of 2-amino-2-methyl-1-propanol, 2-amino-1-butanol, the mono-, di-, and tri-isopropanolamines and ethanolamines, 2-amino-2-methyl-1,3-propanediol, 2-amino-2-ethyl-1,3-propanediol, 2-amino-2-hydroxymethyl-1,3-propanediol, and N-alkyl and N,N-dialkyl derivatives thereof.

3. The composition of claim 2 wherein said alkanolamine is a mixture of 2-amino-2-methyl-1-propanol and monoethanolamine.

4. The composition of claim 3 wherein said mixture consists of from about 8 wt. % to about 30 wt. % 2-amino-2-methyl-1-propanol and from about 3 wt. % to about 25 wt. % monoethanolamine.

5. The composition of claim 1 wherein said chelating agent is ethylenediaminetetraacetic acid or a salt thereof.

6. The composition of claim 5 wherein said chelating agent is a tetrasodium salt of ethylenediaminetetraacetic acid or a trisodium salt of N-hydroxyethylenediaminetetraacetic acid.

7. An aqueous slurry of a comminuted solid comprising a comminuted solid and an effective amount of a dispersing agent, wherein said dispersing agent comprises from about 10 wt. % to about 55 wt. % of an amine compound selected from the group consisting of alkanolamines, triethylamine and morpholine; from about 15 wt. % to about 35 wt. % of a base selected from the group consisting of sodium hydroxide and potassium hydroxide; from about 0.1 wt. % to about 15 wt. % chelating agent; and from about 30 wt. % to about 50 wt. % water.

8. The slurry of claim 7 wherein said comminuted solid is a pigment or a filler.

9. The slurry of claim 7 including from about 0.001 wt. % to about 10.0 wt. % of said dispersing agent.

10. The slurry of claim 7 wherein said alkanolamine is selected from the group consisting of 2-amino-2-methyl-1-propanol, 2-amino-1-butanol, the mono-, di-, and tri-isopropanolamines and ethanolamines, and ethanolamines, 2-amino-2-methyl-1,3-propanediol, 2-amino-2-ethyl-1,3-propanediol, 2-amino-2-hydroxymethyl-1,3-propanediol, and N-alkyl and N,N-dialkyl derivatives thereof.

11. The slurry of claim 10 wherein said alkanolamine is a mixture of 2-amino-2-methyl-1-propanol and monoethanolamine.

12. The slurry of claim 11 wherein said mixture consists of from about 8 wt. % to about 30 wt. % 2-amino-2-methyl-1-propanol and from about 3 wt. % to about 25 wt. % monoethanolamine.

13. The slurry of claim 7 wherein said chelating agent is ethylenediaminetetraacetic acid or a salt thereof.

14. The slurry of claim 13 wherein said chelating agent is a tetrasodium salt of ethylenediaminetetraacetic acid or a trisodium salt of N-hydroxyethylenediaminetetraacetic acid.

15. A method of dispersing a comminuted solid in an aqueous medium comprising the steps of:
   (a) providing an aqueous medium containing a comminuted solid; and
   (b) adding an aqueous dispersing agent to said aqueous medium in an amount sufficient to disperse said comminuted solid, wherein said dispersing agent comprises from about 10 wt. % to about 55 wt. % of an amine compound selected from the group consisting of alkanolamines, triethylamine and morpholine; from about 15 wt. % to about 35 wt. % of a base selected from the group consisting of sodium hydroxide and potassium hydroxide; and from about 0.1 wt. % to about 15 wt. % chelating agent.

16. The method of claim 15 wherein said comminuted solid is a pigment or a filler, and said aqueous medium is a coating.

17. The method of claim 15 wherein said comminuted solid is a pigment and said aqueous medium is a slurry.

18. The method of claim 15 wherein said comminuted solid is calcium carbonate.

19. The method of claim 15 wherein said alkanolamine is selected from the group consisting of 2-amino-2-methyl-1-propanol, 2-amino-1-butanol, the mono-, di-, and tri-isopropanolamines and ethanolamines, 2-amino-2-methyl-1,3-propanediol, 2-amino-2-ethyl-1,3-propanediol, 2-amino-2-hydroxymethyl-1,3-propanediol, and N-alkyl and N,N-dialkyl derivatives thereof.

20. The method of claim 19 wherein said alkanolamine is a mixture of 2-amino-2-methyl-1-propanol and monoethanolamine.

21. The method of claim 20 wherein said mixture consists of from about 8 wt. % to about 30 wt. % 2-amino-2-methyl-1-propanol and from about 3 wt. % to about 25 wt. % monoethanolamine.

22. The method of claim 15 wherein said chelating agent is ethylenediaminetetraacetic acid or a salt thereof.

23. The method of claim 22 wherein said chelating agent is a tetrasodium salt of ethylenediaminetetraacetic acid or a trisodium salt of N-hydroxyethylenediaminetetraacetic acid.

* * * * *

UNITED STATES PATENT AND TRADEMARK OFFICE
CERTIFICATE OF CORRECTION

PATENT NO. : 5,279,664
DATED : January 18, 1994
INVENTOR(S) : Glenn N. Robinson and Gregory E. McWright It is certified that error appears in the above-indentified patent and that said Letters Patent is hereby corrected as shown below:

Column 2, lines 60-62 should read:
--ethanolamines, 2-amino-2-methyl-1,3-propanediol (AMPD$^{TM}$), 2-amino-2-ethyl-1,3-propanediol (AEPD$^{TM}$), 2-amino-2-hydroxymethyl-1,3-propanediol (TRIS AMINO®), and Column 2, line 67, capitalize the registered trademark TRIS AMINO®

Signed and Sealed this

Nineteenth Day of July, 1994

Attest:

BRUCE LEHMAN

*Attesting Officer*   *Commissioner of Patents and Trademarks*